United States Patent
Yamauchi et al.

(10) Patent No.: US 7,380,253 B2
(45) Date of Patent: May 27, 2008

(54) DISK DRIVE APPARATUS

(75) Inventors: Yoshiaki Yamauchi, Minori (JP);
Seiichi Katou, Tsuchiura (JP); Shinya Tsubota, Mito (JP); Yoshihiro Fukagawa, Yokihama (JP); Makoto Ibe, Hitachinaka (JP); Kuniyuki Kimura, Fujisawa (JP); Seiji Hamaie, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 568 days.

(21) Appl. No.: 11/044,702

(22) Filed: Jan. 26, 2005

(65) Prior Publication Data

US 2005/0289574 A1    Dec. 29, 2005

(30) Foreign Application Priority Data

Jun. 25, 2004   (JP)   ............... 2004-188043

(51) Int. Cl.
  *G11B 33/08*   (2006.01)
(52) U.S. Cl. .................................... 720/651
(58) Field of Classification Search ........... 720/651, 720/606, 697; 360/264.2, 99.08; 369/253, 369/263, 264
See application file for complete search history.

(56) References Cited

U.S. PATENT DOCUMENTS

| | | | | |
|---|---|---|---|---|
| 6,005,836 A | * | 12/1999 | Choi | ............... 720/697 |
| 6,061,325 A | * | 5/2000 | Zaun | ............... 369/264 |
| 6,438,094 B1 | * | 8/2002 | Mahr et al. | ............... 369/253 |
| 6,854,124 B2 | * | 2/2005 | Shimizu et al. | ............... 720/606 |
| 7,023,657 B2 | * | 4/2006 | Sohn et al. | ............... 360/99.08 |
| 7,119,993 B2 | * | 10/2006 | Zuo et al. | ............... 360/264.2 |
| 2003/0035362 A1 | * | 2/2003 | Akimaru et al. | ............... 369/263 |

FOREIGN PATENT DOCUMENTS

| | | |
|---|---|---|
| JP | 09-044950 | 2/1997 |
| JP | 2001-355670 | 12/2001 |
| JP | 2001355670 A | * 12/2001 |

* cited by examiner

*Primary Examiner*—Tianjie Chen
(74) *Attorney, Agent, or Firm*—Townsend and Townsend and Crew LLP

(57) ABSTRACT

In a recording disk drive apparatus including, a chassis including a chassis body, a spindle motor fixed to the chassis body to support and rotationally drive a recording disk, and a head supported on the chassis body to be movable on the chassis body in a radial direction of the recording disk so that an information is recorded into the recording disk and/or read from the recording disk through the head, a base member on which the chassis is supported, and an elastic member through which the chassis is supported on the base member so that a vibration transmitted from the chassis is absorbed at least partially by an elasticity of the elastic member, the chassis includes a counter member elastically supported on the chassis body with a spring constant for the counter member in which spring constant the counter member is elastically movable with respect to the chassis body.

11 Claims, 7 Drawing Sheets

DISK DRIVE APPARATUS

BACKGROUND OF THE INVENTION

The present invention relates to a disk drive apparatus for recording an information or signal into a recording disk, for example, an exchangeable recording disk such as CD, DVD or the like and/or reading the information or signal from the recording disk.

In a prior art disk drive apparatus as disclosed by JP-A-2001-355670, a balance plate is supported on a mechanical chassis through elastic members to form a dynamic damper for absorbing a vibration.

In a prior art disk drive apparatus as disclosed by JP-A-9-44950, a pressing plate is pressed by a damper of elastic member against a damper 3 for clamping an optical disk onto a turn table to absorb a vibration.

BRIEF SUMMARY OF THE INVENTION

An object of the present invention is to provide a disk drive apparatus for recording an information or signal into a recording disk and/or reading the information or signal from the recording disk, in which apparatus a vibration generated by, for example, a rotation of the recording disk, is absorbed.

In a recording disk drive apparatus for recording an information into a recording disk and/or reading the information from the recording disk, comprising, a chassis including a chassis body, a spindle motor fixed to the chassis body to support and rotationally drive the recording disk, and a head supported on the chassis body to be movable on the chassis body in a radial direction of the recording disk so that the information is recorded into the recording disk and/or read from the recording disk through the head, a base member on which the chassis is supported, and an elastic member through which the chassis is supported on the base member so that a vibration transmitted from the chassis is absorbed at least partially by an elasticity of the elastic member, according to the invention, the chassis further includes a counter member elastically supported on the chassis body with a spring constant for the counter member in which spring constant the counter member is elastically movable with respect to the chassis body.

Since the chassis further includes a counter member elastically supported on the chassis body with a spring constant for the counter member in which spring constant the counter member is elastically movable with respect to the chassis body, the counter member brought into its self-excited vibration through the spring constant on the chassis absorbs the vibration of the chassis.

If a (maximum) rotational frequency of the spindle motor for rotationally driving the recording disk when the information is recorded into the recording disk and/or read from the recording disk through the head is more than a characteristic frequency of the chassis determined in accordance with a mass of the chassis and a spring constant of the elastic member and less than a characteristic frequency of the counter member determined in accordance with a mass of the counter member and the spring constant for the counter member, the counter member absorbs effectively the vibration of the chassis generated by the rotation of the recording disk.

If the counter member includes an electrically conductive portion so that at least one of an electric energy for driving the spindle motor, an electric control signal for controlling the spindle motor, an electric energy for driving the head, an information electric signal transmitted between the head and the recording disk and an electric control signal for controlling the head is transmitted through the electrically conductive portion of the counter member, a weight or mass of the counter member is increased by the electrically conductive portion to increase a capacity of absorbing the vibration of the chassis with the self-excited vibration of the counter member.

If the counter member has at least two counter elastic elements discrete with respect to each other so that the spring constant for the counter member for supporting elastically the counter member with respect to the chassis body is formed by the at least two counter elastic elements, a clearance between the chassis body and the counter member is securely kept. It is preferable for supporting an end of the counter member with a bending elasticity between the counter member and the chassis body that the counter member has a counter elastic element connected to the chassis body, and a length of the counter elastic element in a direction parallel to a thickness direction of the recording disk is elastically changeable to form at least partially the spring constant for the counter member, so that the counter member supported on the chassis body with the bending elasticity of a cantilever-shape keeps securely the clearance between the chassis body and the counter member.

If the spring constant for the counter member is formed at least partially by a counter elastic element, and the counter elastic element includes an elastomer adhering to the chassis body and the counter member, the elasticity for supporting the counter member on the chassis body is prevented from changing in accordance with a contact or pressing condition between the counter elastic element and each of the counter member and the chassis body. It is preferable for effectively absorbing an energy of the vibration of the chassis that the elastomer includes butyle rubber.

It is preferable for improving a fatigue strength of adhering between the counter elastic element and at least one or each of the counter member and the chassis body that as seen in a thickness direction of the recording disk, the counter elastic element protrudes outwardly from at least one or each of side edges of at least one of the counter member and the chassis body which side edges are opposed each other in a direction perpendicular to the thickness direction while the counter elastic element extends continuously between the side edges, that as seen in a direction perpendicular to a thickness direction of the recording disk, the counter elastic element protrudes outwardly from at least one of surfaces of at least one of the counter member and the chassis body which surfaces are opposed each other in the thickness direction while the counter elastic element extends continuously between the surfaces, and/or that as seen in the thickness direction of the recording disk, (a part(s) of) the counter elastic element and the counter member overlap each other at least partially while (the part(s) of) the counter elastic element protrudes outwardly from at least one of side edges of at least one of the counter member and the chassis body which side edges are opposed each other in a direction perpendicular to the thickness direction and (the part(s) of) the counter elastic element extends continuously between the side edges.

If the recording disk drive apparatus further comprises a flexible electrically connecting wire being connected to the counter member and deformable in accordance with a movement of the counter member so that at least one of an electric energy for driving the spindle motor, an electric control signal for controlling the spindle motor, an electric energy for driving the head, an information electric signal transmitted between the head and the recording disk and an electric control signal for controlling the head is capable of being transmitted through the counter member and the flexible electrically connecting wire when the counter member vibrates, a weight or mass brought into the self-excited vibration together with the counter member is increased by the flexible electrically connecting wire to increase the capacity of absorbing the vibration of the chassis with the self-excited vibration of the counter member and the flexible electrically connecting wire. It is preferable for absorbing the vibration of the chassis with the self-excited vibration of a combination of the counter member and the flexible electrically connecting wire that a characteristic frequency of the chassis determined in accordance with a mass of the chassis and a spring constant of the elastic member is less than a characteristic frequency of the counter member with the flexible electrically connecting wire determined in accordance with a mass of the combination of the counter member and the flexible electrically connecting wire and the spring constant for the counter member.

It is preferable for increasing a weight or mass brought into its self-excited vibration for absorbing the vibration of the chassis or a region in which the weight or mass extends or exists that when the recording disk drive apparatus comprises a screw pressing the spindle motor against the chassis body, the counter member having a characteristic frequency determined in accordance with a mass of the counter member and the spring constant for the counter member which characteristic frequency is more than a (maximum) rotational frequency of the spindle motor for rotationally driving the recording disk when the information is recorded into the recording disk and/or read from the recording disk through the head and a characteristic frequency of the chassis determined in accordance with a mass of the chassis and a spring constant of the elastic member extends (exists) at a radial outside of (with respect to) an imaginary circle having a radial center of a rotational axis of the spindle motor and passing the screw as seen in a thickness direction of the recording disk.

It is preferable for increasing the weight or mass brought into its self-excited vibration for absorbing the vibration of the chassis or the region in which the weight or mass extends or exists that the counter member has a characteristic frequency determined in accordance with a mass of the counter member and the spring constant for the counter member which characteristic frequency is more than a (maximum) rotational frequency of the spindle motor for rotationally driving the recording disk when the information is recorded into the recording disk and/or read from the recording disk through the head and a characteristic frequency of the chassis determined in accordance with a mass of the chassis and a spring constant of the elastic member, and as seen in a thickness direction of the recording disk, a minimum distance between a rotational axis of the spindle motor and an outer peripheral edge of the counter member is smaller than a difference between the minimum distance and a maximum distance between the rotational axis of the spindle motor and the outer peripheral edge of the counter member.

Other objects, features and advantages of the invention will become apparent from the following description of the embodiments of the invention taken in conjunction with the accompanying drawings.

DETAILED DESCRIPTION OF THE INVENTION

Hereafter, with making reference to FIGS. 1-6, a structure of a disk drive apparatus as an embodiment of the invention will be explained. Incidentally, although the disk drive apparatus for CD, DVD or the like is explained below, the invention is applicable to the other disk drive apparatus.

Figure 1:
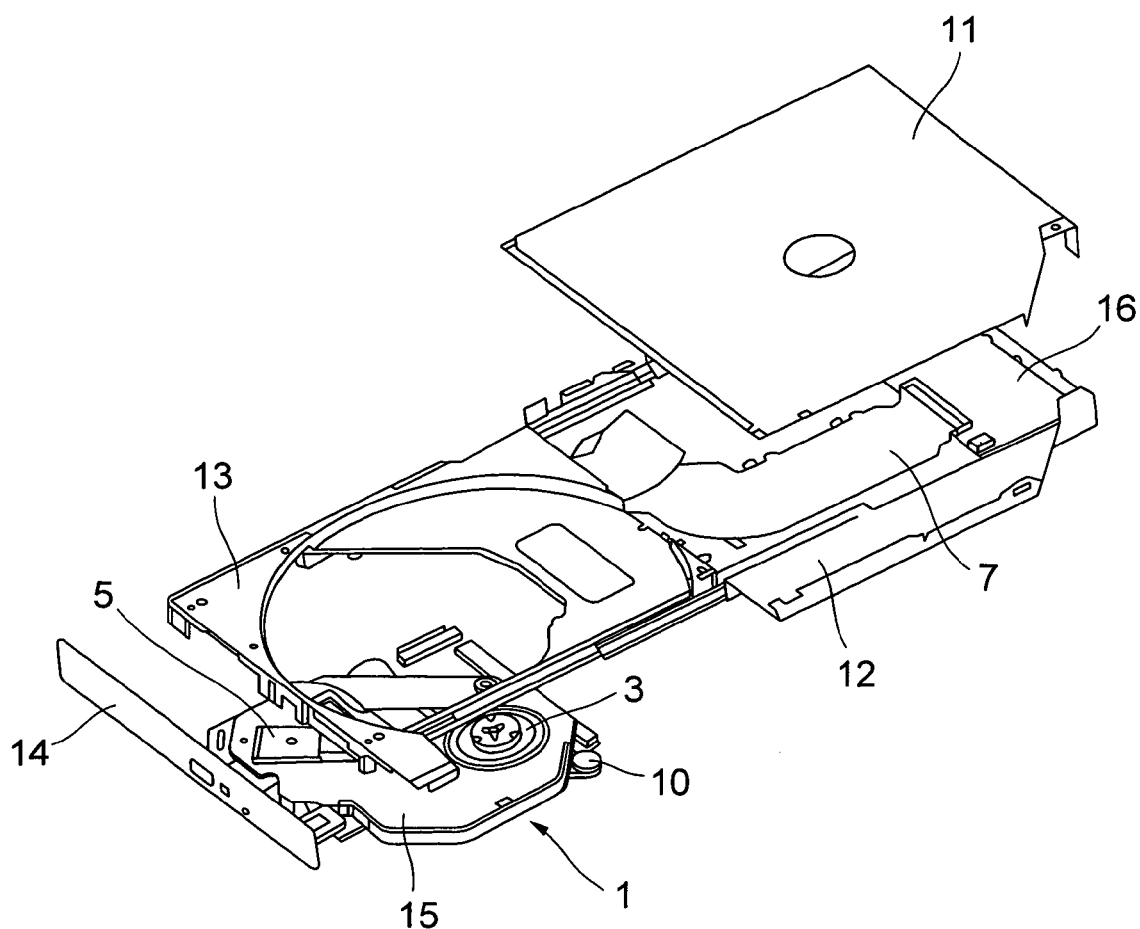
FIG. 1 is a schematic oblique projection view showing an embodiment of a disk drive apparatus according to the invention.

At first, with making reference to FIG. 1, the whole of the disk drive apparatus as the embodiment is explained.

FIG. 1 is an oblique projection exploded view showing the whole of the disk drive apparatus as the embodiment of the invention. FIG. 1 shows a CD/DVD apparatus of a slim drive (apparatus thickness 12.7 mm) to be incorporated into a note-type personal computer or the like.

The disk drive apparatus as the embodiment of the invention uses an information recording and reproducing medium of a disk shape having a diameter of 120 mm and a thickness of 1.2 mm, and has a thin box shape as shown in FIG. 1. Each of width and depth of the apparatus is about 130 mm, and a thickness of the apparatus is 12.7 mm.

A frame of the apparatus includes a bottom cover 12 and a top cover 11 formed by thin plates of aluminum or the like through a press work. In the apparatus, a disk tray 13 for taking in and out a disk 20 is supported by guide mechanisms arranged at both side surfaces of the bottom cover 12. The disk tray 13 has a circular groove whose diameter is slightly greater than an outer diameter of the disk to position the disk to be mounted. Further, the disk tray 13 has a front panel 14 of a resin plate. When the disk drive apparatus is actually operated, the disk tray 13 takes in and out the disk 20 in response to an operation of a disk tray taking in and out operation button arranged on the front panel 14. Under the disk tray 13, a mechanical chassis 1 including a spindle motor for rotating the disk 20, an optical head for reproducing an information from the disk 20 and recording the information thereto and a unit cover 14 is elastically supported by a plurality of vibration damper legs 10. Behind the bottom cover 12, a main circuit substrate 16 of the disk drive apparatus is arranged. The main circuit substrate 16 is connected to a spindle motor circuit substrate 4 of the mechanical chassis 1 by a flexible printed circuit (FPC) 17.

An operation of the disk drive apparatus is explained below. In response to the operation of the disk taking in and out operation button arranged on the front panel 14, the disk tray is moved out. After mounting the disk 20 onto the disk tray 13, the disk tray is moved into the apparatus to mount the disk 20 onto the spindle motor 3. Thereafter, the optical head detects as to whether or not the disk 20 exists, and the spindle motor 3 drives the disk 20 at a rated rotational speed when the inserted disk 20 is detected. Subsequently, the information is reproduced from the disk 20 or recorded into the disk, in accordance with an user's requirement.

It is required for the disk drive apparatus to stably operate so that the information is reproduced from the disk 20 and is recorded into the disk. On the other hand, since the disk 20 as the recording medium with standardized thickness and outer dimensions is formed through a press forming, the disk has a positional error of a center of gravity and a warp. Therefore, a vibration of the disk 20 is generated when the disk is rotated at a high speed. This vibration causes a relative movement between the disk 20 and the optical head 5 to deteriorate a stability of reproduction and recording. Further, the vibration of the disk 20 is transmitted to the disk tray 13 and the frame of the apparatus from the mechanical chassis 1 through the vibration damper legs 10 to deteriorate a performance of the disk drive apparatus. The recording and reproduction performance has been maintained generally to make a value of the vibration of the frame of the apparatus not more than a specific value of the apparatus by adjusting a ratio between the vibration of the mechanical chassis and the vibration of the disk tray 13 and the frame of the apparatus in accordance with a performance of the vibration damper legs 10, but it is made by an increase in rotational speed of the disk 20 difficult for both of the performances to be satisfied.

Figure 2:
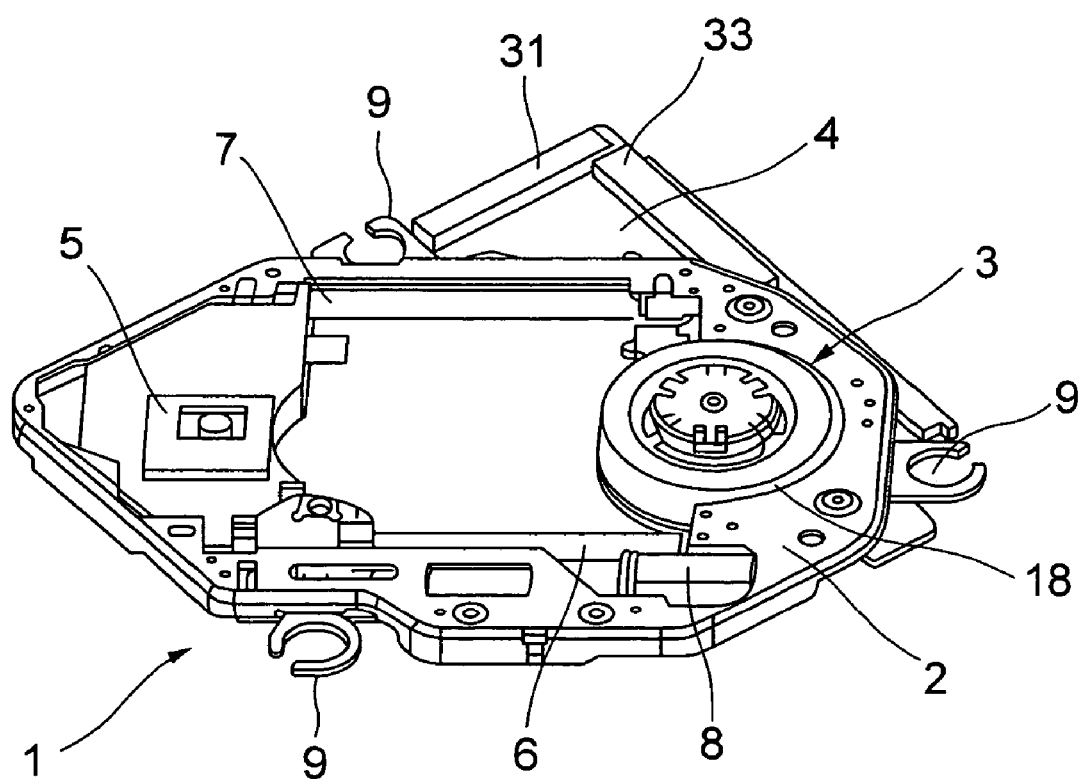
FIG. 2 is a schematic oblique projection view showing a mechanical chassis used in the disk drive apparatus according to the invention.

Next, with making reference to FIG. 2, a structure of the mechanical chassis 1 as a main part of the disk drive apparatus as the embodiment of the invention is explained.

FIG. 2 is an oblique projection view showing the structure of the mechanical chassis 1 used in the disk drive apparatus as the embodiment of the invention is explained.

FIG. 2 shows an outer appearance of the mechanical chassis 1 obtainable when a unit cover 15 for covering an upper surface of the mechanical chassis 1 is removed to show in detail each of parts incorporated in the mechanical chassis 1.

The spindle motor 3 (including the spindle motor circuit substrate 4) is fixed by screws to the mechanical chassis body 2 made of stainless steel or the like. The disk is supported on the spindle motor 3. The optical head 5 is supported by a main guide bar 6 and a supplemental guide bar 7. The optical head 5 is driven by a drive means of a motor 8 and gears to be movable in a radial direction of the disk. Three vibration damper mounting portions 9 are arranged on the mechanical chassis body 2. The mechanical chassis 1 is elastically supported on the disk tray 13 (or the frame) through the vibration damper legs 10 attached to the mounting portions 9 as shown in FIG. 1.

It is necessary for reducing the vibration generated by the rotation of the disk that the mechanical chassis 1 forming one piece with the disk has a large mass, but it is difficult for an additional mass such as additional part to be added because a weight saving of the disk drive apparatus is required. Further, since it is difficult for the mechanical chassis vibration (inner vibration) and the apparatus frame vibration (outer vibration) to be adjusted appropriately by a characteristic of the vibration damper legs, a reduction of the vibration generated by the disk rotation or an absorption of the generated vibration is necessary.

For mounting a structure for the reduction of the vibration onto an actual apparatus such as a thin drive apparatus, for example, a slim drive, it needs to be arranged in a limited space, but a clearance between the upper surface of the mechanical chassis 1 and the disk is of about 0.3-0.5 mm. Further, a clearance between a lower surface of the mechanical chassis 1 and the bottom cover 12 is of about 0.3 mm, so that it is difficult for the additional part to be mounted, and the volume of the existing members needs to be utilized, that is, the existing members need to be utilized.

Therefore, in this embodiment, the part of the mechanical chassis for the spindle motor 3 has a function of a dynamic vibration damper for absorbing the vibration generated by the rotation of the disk 20.

Next, with making reference to FIG. 3, a principle of the dynamic vibration damper to be used in the disk drive apparatus of the embodiment will be explained.

In the frame, a mass (M1) is supported by an elastic member (spring constant K1). In this case, the mass corresponds to the mechanical chassis 1, and the elastic member (K1) corresponds to the vibration damper legs 10. Further, the mass (M1) includes a rotary member corresponding to the disk 20. Further, the mass (M1) includes another mass 22 (M2) and another elastic member 23 (K2) supporting the mass 22 (M2) to form a dynamic damper 21. When the rotary member rotates, a centrifugal force (F) calculated along the following formula (1) from an unbalance (hereafter called as eccentric value of center of gravity) m·ε and a square of a rotational frequency (f=ω/2π) is generated.

$$F = m \cdot \epsilon \cdot \omega^2 \quad (1)$$

By this centrifugal force (F), a primary eccentric vibration is generated on the rotation mass (M1). In this case, a characteristic frequency (f1) is determined in accordance with the mass 1 (M1) and the elastic member 10 (K1). Further, a characteristic frequency (f2) is determined in accordance with the mass 22 (M2) and the elastic member 23 (K2) forming the dynamic vibration damper 21. In the dynamic vibration damper, when f1<f2, the vibration can be reduced in a frequency band from f1 to f2. That is, for reducing the primary vibration of the rotating disk 20, the rational frequency f of the rotating disk is set in such a manner that f1<f<f2.

Next, with making reference to FIGS. 4A and 4B, a vibration characteristic of the mechanical chassis 1 of the disk drive apparatus of the embodiment will be explained.

Figure 4A:
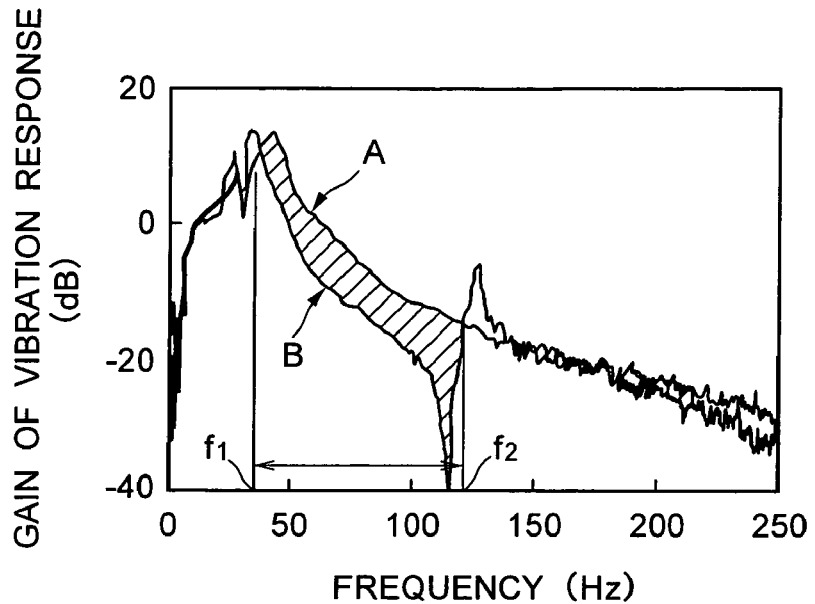
FIG. 4A is a diagram showing a relation ship between a vibration frequency and a vibration amplitude in each of a case in which a vibration is absorbed by a vibration absorbing mechanism and a case in which a vibration is not absorbed by the vibration absorbing mechanism.
Figure 4B:
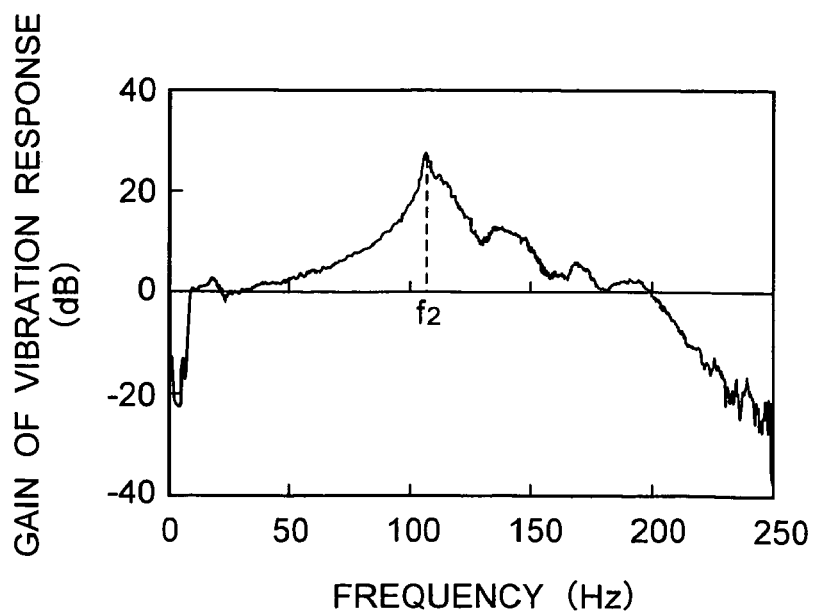
FIG. 4B is a diagram showing a relation ship between a vibration frequency and a vibration amplitude in a vibration of the vibration absorbing mechanism.

FIGS. 4A and 4B are views for explaining the vibration characteristic of the mechanical chassis of the disk drive apparatus of the embodiment.

FIGS. 4A and 4B show the vibration characteristics of the mechanical chassis 1 having the dynamic vibration damper structure 21. The mechanical chassis 1 as shown in FIG. 2 is used, the unit cover 15 as shown in FIG. 1 is used as the mass of the dynamic vibration damper structure 21, and the unit cover 15 is supported through the elastic member on the mechanical chassis body 2. The mechanical chassis 1 is mounted on an evaluation table through the vibration damper legs 10 attached to the three vibration damper leg mounting portions 9 as shown in FIG. 2. In an experiment for the vibration characteristic, a vibration acceleration of random waveform is applied to the evaluation table, and a vibration acceleration of the mechanical chassis 1 generated through the vibration damper legs 10 by the input acceleration is measured as a response gain.

In FIG. 4A, a solid line A shows the vibration characteristic of the prior art without the dynamic vibration damper, and a solid line B shows the vibration characteristic of the mechanical chassis 1 having the dynamic vibration damper 21. In FIG. 4B, the vibration characteristic by the unit cover 15 and the elastic member as the dynamic vibration damper 21 is evaluated in response gain of vibration acceleration similarly to FIG. 4A.

As seen from the prior art vibration characteristic shown by the solid line A in FIG. 4A, the characteristic frequency (f1) of the mechanical chassis 1 and the vibration damper legs 10 is about 40 Hz. Further, as seen from the vibration characteristic of the dynamic vibration damper structure 21 as shown in FIG. 4B, the characteristic frequency of the dynamic vibration damper structure 21 of the unit cover 15 and the elastic support member is about 110 Hz. As described below, this case is set in such a manner that a multiplication of reproduction speed of the disk drive apparatus is 24, and the rotational frequency of the disk is 90 Hz.

As seen from the solid line B in FIG. 4B, the vibration characteristic with the dynamic vibration damper 21 is reduced in response gain of vibration by about 6-10 dB in the frequency band from the characteristic frequency f1 to the characteristic frequency f2 as shown by slanting lines. That is, if a maximum value of the vibration of the disk drive apparatus is generated at the rotational frequency of the disk 20, as explained above, the vibration can be decreased by that the characteristic frequency f1 of the mechanical chassis 1 and the vibration damper legs 10 and the characteristic frequency f2 of the dynamic vibration damper structure 21 are set in such a manner that f1<f<f2.

For example, in CD apparatus, a multiplication of the reproduction speed for the information from the disk is, 24, 32, 40, 48 and so forth. The rotational speed of the disk 20 is 5400 revolutions per minute at the multiplication of 24, and 10500 revolutions per minute at the multiplication of 48. That is, the rotational frequency is about 90 Hz at the multiplication of 24 and about 175 Hz at the multiplication of 48.

Therefore, the characteristic frequency of the dynamic vibration damper structure 21 used in the disk drive apparatus for reducing the vibration of the disk rotating at the maximum multiplication of reproduction speed is desired. The disk 20 having an outer diameter of 120 mm usable in CD or DVD apparatus has a data region of the maximum diameter of 116 mm. Further, a circumferential speed between the optical head 5 and a portion of the disk 20 from which the information is reproduced is 1.3±0.1 m/sec when the multiplication of reproduction speed is 1, and becomes 1.4 m/sec as the maximum value. In this case, by making the characteristic frequency f2 of the dynamic vibration damper structure greater by from some Hz to about 20 Hz than the frequency calculated along the following formula (2).

$f$(Hz)=circumferential speed (1400 mm/sec)×multiplication n/maximum circumferential length of data region (about 364 mm on disk of 116 mm diameter)     (2), the vibration at the maximum rotational speed of the disk.

Incidentally, in the formula (2), f is the characteristic frequency of the CD apparatus, and the value obtained along the formula (2) should be increased by three times when the DVD apparatus is used. That is, when the multiplication of reproduction speed of the DVD apparatus is 8, the characteristic frequency f is 92 Hz (=1400×8×3/(3.14×116)). Therefore, in the DVD apparatus with the multiplication of 8, the characteristic frequency f2 of the dynamic vibration damper structure is made greater by from some Hz to about 20 Hz than f=92 Hz, that is, set at 100-120 Hz. Incidentally, although it is described above that the characteristic frequency of the DVD apparatus is increased by three times than that of the CD apparatus, it is precise that the characteristic frequency of the DVD apparatus should be increased by about three times than that of the CD apparatus, because the circumferential speed in the DVD apparatus is 3.49 m/sec.

Figure 5:
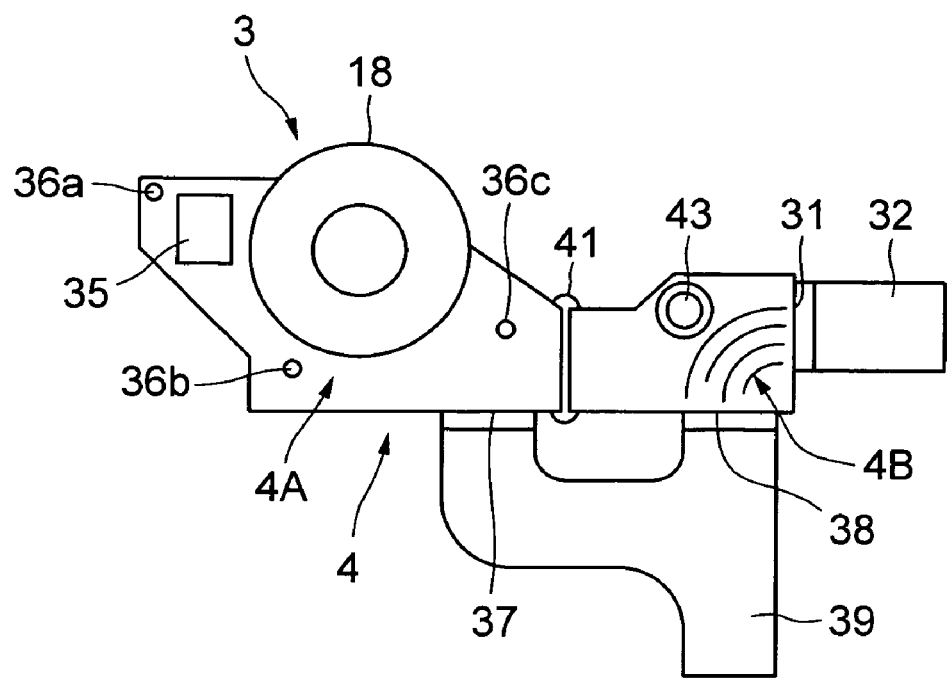
FIG. 5 is a front view showing a mechanical chassis including the vibration absorbing mechanism.
Figure 6:
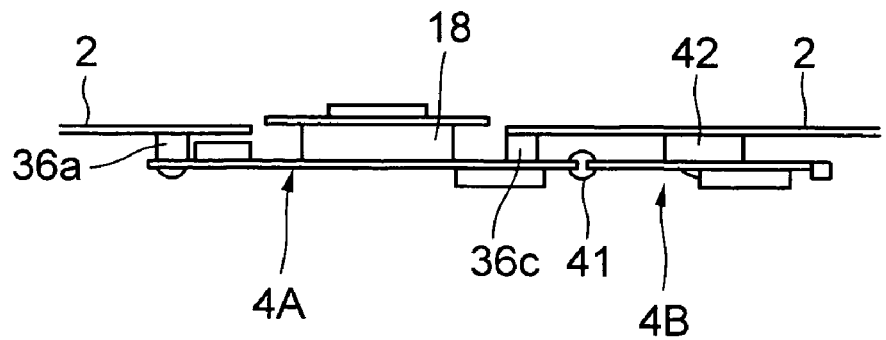
FIG. 6 is a side view showing the mechanical chassis including the vibration absorbing mechanism.

Next, with making reference to FIGS. 5 and 6, the dynamic vibration damper included by the mechanical unit 1 of the disk drive apparatus of the embodiment is explained.

FIG. 5 is a front view showing the mechanical unit including the dynamic vibration damper to be used for the disk drive apparatus of the embodiment of the invention. FIG. 6 is a side view showing the mechanical unit including the dynamic vibration damper to be used for the disk drive apparatus of the embodiment of the invention. The reference signs used in FIGS. 1 and 2 indicate the same parts respectively.

As shown in FIGS. 5 and 6, the spindle motor 3 has a rotor part 18 for rotating and holding the disk 20 and the circuit substrate 4. The circuit substrate 4 has generally a thin metallic member, and various circuit parts such as an IV chip 35, a resistance, pattern wires and so forth on a surface of the thin metallic member, and the wires perform input and output of control signals through the FPC and a connector portion arranged on a side surface of the circuit substrate 4. The spindle motor 3 is fixed to the mechanical chassis body 2 by three fixing screws 36*a, b, c* around the rotor part 16 as a center thereof.

In the dynamic vibration damper structure, a movable portion needs to be brought into self-excited vibration by an external vibration exciting force. Therefore, the spindle motor of the embodiment has the movable portion in the spindle motor circuit substrate 4. That is, the spindle motor circuit substrate 4 includes the rotor part 18 for rotating and holding the disk 20, a fixing part 4A fixed to the mechanical chassis body 2, and a movable part 4B for absorbing the vibration energy as the dynamic vibration damper structure, and the fixing part 4A and the movable part 4B are connected to each other through a first elastic member 41. In the embodiment, a part of the spindle motor circuit substrate is used as the movable port to form the dynamic vibration damper structure.

The vibration generated by the rotation of the disk is transmitted to the fixing part 4A of the spindle motor circuit substrate 4 through the rotor part 18 of the spindle motor 3 and the mechanical chassis body 2, and further transmitted to the movable part 4B through the first elastic member 41 so that the movable part 4B is brought into the self-excited vibration to absorb the vibration energy of the mechanical chassis body 2 and the forth to be decreased. In this case, when the movable part 4B of the spindle motor circuit substrate 4 has a cantilever shape, the movable part 4B is supported on the mechanical chassis body 2 through a second elastic member 42 mounted on the mechanical chassis by a screw 43 or the like as shown in FIG. 6 so that a performance is restrained from being deteriorated by a contact caused by the vibration amplitude of the movable part 4B between the movable part 4B and another member such as the mechanical chassis body 2 over the circuit substrate 4 or a part under the spindle motor circuit substrate 4. Incidentally, although the movable part is elastically supported on the mechanical chassis body 2 in the above embodiment, it may be elastically supported on the frame under the spindle motor circuit substrate 4 or another part.

Figure 3:
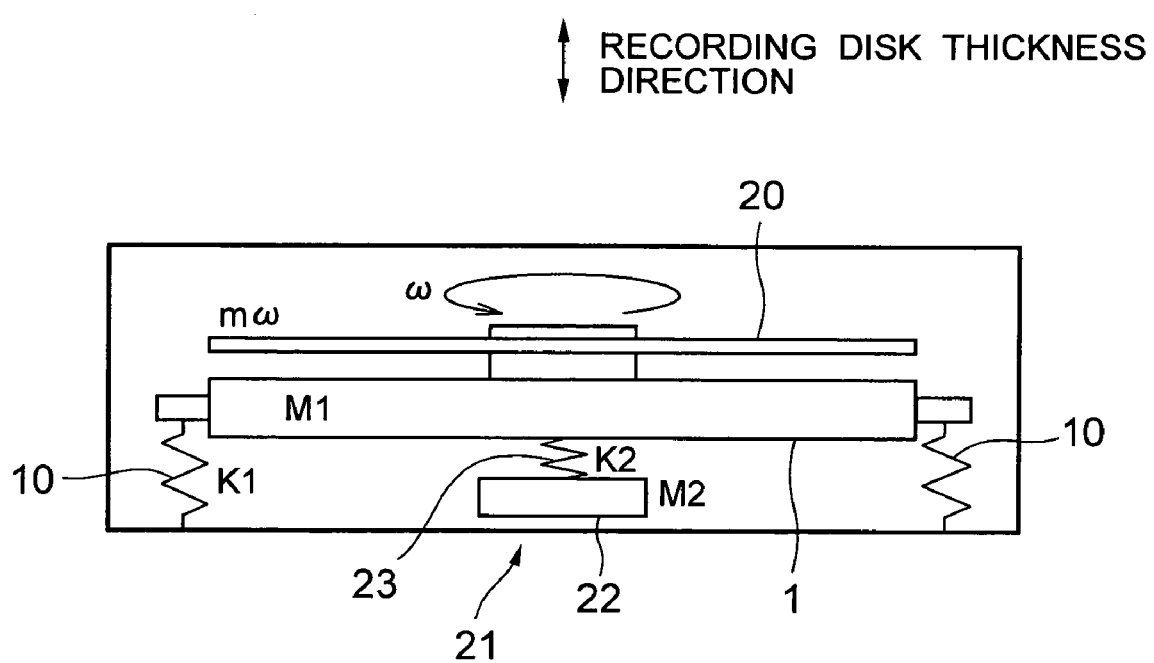
FIG. 3 is a schematic view for explaining a principle of absorbing a vibration according to the invention.

A characteristic frequency of the movable part 4B of the spindle motor circuit substrate 4 as the dynamic vibration damper structure 21 is set in accordance with the maximum multiplication of reproduction speed of the disk drive apparatus (the maximum rotational frequency of the disk) as explained in FIGS. 3, 4A and 4B.

The spindle motor circuit substrate 4 has a first connector 31, a second connector 37 and a third connector 38. The first connector is connected to the optical head 5 through the first FPC 32. The second connector 37 is used to input and output the signal with respect to the spindle motor 3, and the third connector 38 is used to input and output the signal with respect to the optical head 5. The second and third connectors 37 and 38 are connected to a main circuit substrate of the disk apparatus through the second FPC 39. The wires of the movable part 4B of the spindle motor circuit substrate 4 are straightly connected to the first and third connectors 31 and 38.

As explained above, in the embodiment, the vibration generated by the rotation of the disk 20 is absorbed by the dynamic vibration damper structure (movable part 4B) included by the spindle motor circuit substrate 4 so that the vibration of the mechanical chassis 1 is decreased.

Figure 7:
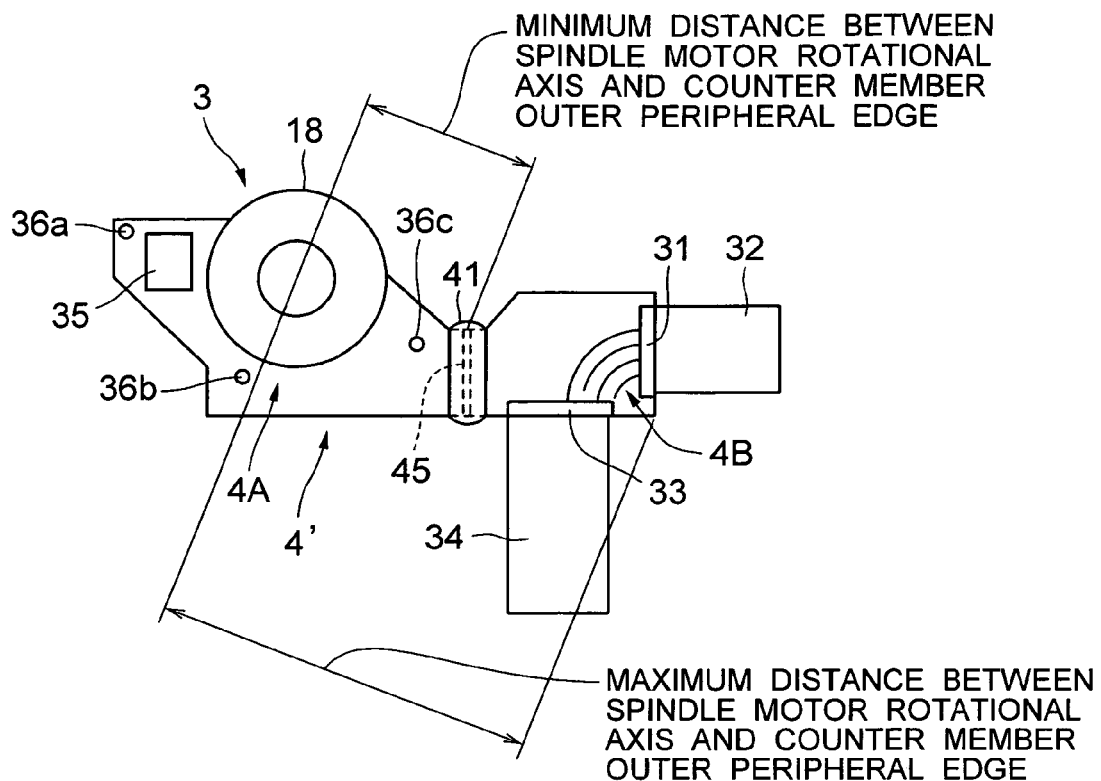
FIG. 7 is a front view showing another mechanical chassis including the vibration absorbing mechanism.
Figure 8:
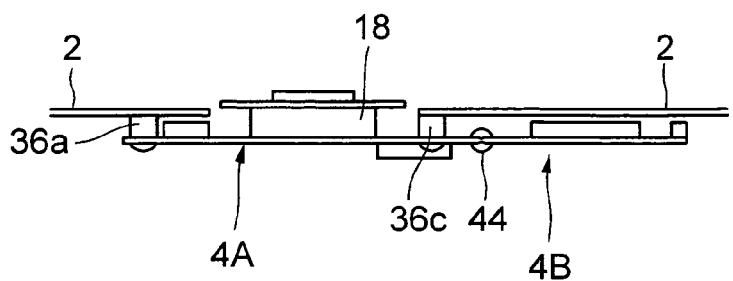
FIG. 8 is a side view showing the another mechanical chassis including the vibration absorbing mechanism.
Figure 9:
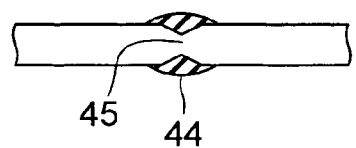
FIG. 9 is a partially cross sectional enlarged view showing an elastic portion forming a spring constant for supporting elastically a counter member of the vibration absorbing mechanism.

Next, with making reference to FIGS. 7-9, a structure of another embodiment of the disk drive apparatus is explained. Incidentally, the structure of the disk drive apparatus is similar to the structure shown in FIGS. 1 and 2.

FIG. 7 is a front view showing the structure of the spindle motor having the dynamic vibration damping structure to be used in the disk drive apparatus as another embodiment of the invention. FIG. 8 is a side view showing the structure of the spindle motor having the dynamic vibration damping structure to be used in the disk drive apparatus as the another embodiment of the invention. FIG. 9 is a partially cross sectional enlarged view of FIG. 7. Incidentally, the reference signs used in FIGS. 5 and 6 indicate the same parts respectively.

As shown in FIGS. 7 and 8, the spindle motor circuit substrate 4 has the rotor part 18 for rotating and holding the disk 20, the fixing part 4A fixed to the mechanical chassis body 2, and the movable part 4B for absorbing the vibration energy as the dynamic vibration damper structure, and the fixing part 4A and the movable part 4B are connected to each other through a notch portion 45. When an external force is applied to the spindle motor 3, the movable part 4B is brought into self-excited vertical vibration. The notch portion 45 is formed on each surface of the spindle motor circuit substrate 4 as shown in FIG. 9, but may be formed only one of them. Further, a third elastic member may be arranged on the notch portion 45 to have a damping effect on the vibration amplitude so that a contact with another member is prevented. The characteristic frequency of the movable part 4B of the spindle motor circuit substrate 4 as the dynamic vibration damper structure is set in accordance with the maximum multiplication of reproduction speed of the disk drive apparatus as explained in FIG. 3.

The spindle motor circuit substrate 4 has the first an second connectors 31 and 33. The first connector 31 is connected to the optical head trough the first FPC 32. The second connector 33 is connected to the main circuit substrate 16 of the disk apparatus through the second FPC 34.

In taking a vertical clearance on the movable part 4B of the spindle motor circuit substrate 4 into consideration, the movable part 4B may be supported on the mechanical chassis body 2 or another member through the elastic member as shown in FIG. 6.

Incidentally, although the notch portion 45 is formed between the fixing part 4A and the movable part 4B of the spindle motor circuit substrate 4 top form the elastic structure in the above explanation, the same effect is obtainable by decreasing a cross sectional area of the substrate between the fixing part 4B and the movable part 4B. In other words, a width of the substrate may be decreased instead of the notch portion 45.

Figure 10A:
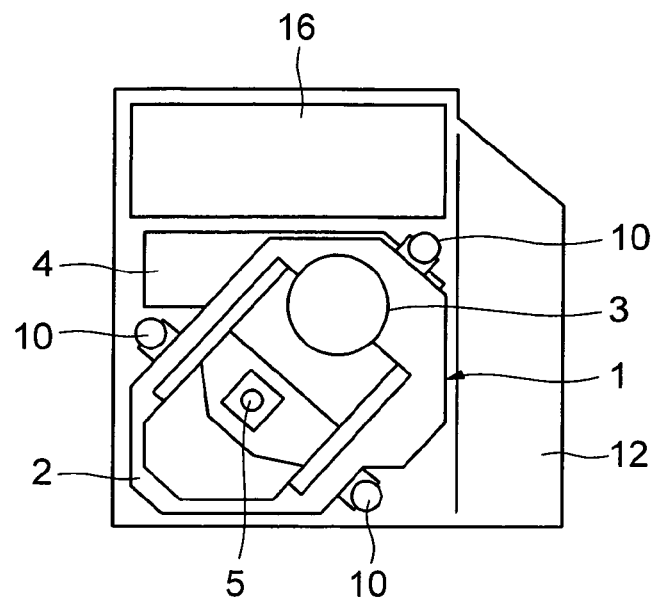
FIG. 10A is a front view showing another mechanical chassis including the vibration absorbing mechanism.
Figure 10B:
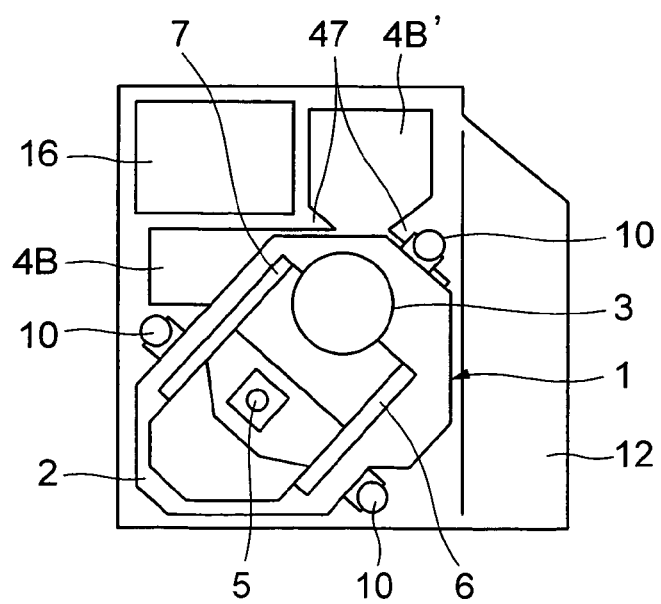
FIG. 10B is a front view showing another mechanical chassis including the vibration absorbing mechanism.

Next, with using FIGS. 10A and 10B, a structure of another embodiment of the disk drive apparatus is explained. Incidentally, the structure of the disk drive apparatus of this embodiment is similar to the structure shown in FIGS. 1 and 2.

FIGS. 10A and 10B are front views showing the structure of the mechanical chassis including the dynamic vibration damper structure to be used in the disk drive apparatus of the another embodiment of the invention. Incidentally, the reference signs used in FIGS. 1 and 2 indicate the same parts respectively.

In FIGS. 10A and 10B, the top cover 11, disk tray 12 and unit cover 15 are removed to show an inner structure of the disk drive apparatus such as the slim drive.

FIG. 10A shows the arrangement of the spindle motor in the embodiment shown in FIGS. 5-9. The main circuit substrate 16 of the disk apparatus is arranged on the mechanical chassis 1 so that a clearance for another member is not formed as shown. Therefore, in this embodiment, a part of the spindle motor circuit substrate 4 is utilized.

If the main circuit substrate 16 of the disk drive apparatus has a compact size and is arranged at a left side as shown in FIG. 10B, the spindle motor circuit substrate 4' can have an enlarged size, so that the movable part 4B as the dynamic vibration damper structure is formed at a right side clearance of the main circuit substrate 16 by forming a notch portion 47 decreasing a width of the substrate. Therefore, a volume of the movable part 4B of the spindle motor circuit substrate 4' can be increased to improve the absorption effect for the vibration of the disk rotation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording disk drive apparatus for recording an information into a recording disk and/or reading the information from the recording disk, comprising, a chassis including a chassis body, a spindle motor fixed to the chassis body to support and rotationally drive the recording disk, and a head supported on the chassis body to be movable on the chassis body in a radial direction of the recording disk so that the information is recorded in to the recording disk and/or read from the recording disk through the head, a base member on which the chassis is supported, and an elastic member through which the chassis is supported on the base member so that a vibration transmitted from the chassis is absorbed at least partially by an elasticity of the elastic member, wherein the chassis further includes a counter member elastically supported on the chassis body to be movable with a spring constant with respect to the chassis body, wherein the counter member includes an electrically conductive portion so that at least one of an electric energy for driving the spindle motor, an electric control signal for controlling the spindle motor, an electric energy for driving the head, an information electric signal transmitted between the head and the recording disk and an electric control signal for controlling the head is transmitted through the electrically conductive portion of the counter member.

2. A recording disk drive apparatus according to claim 1, wherein a rotational frequency of the spindle motor for rotationally driving the recording disk when the information is recorded into the recording disk and/or read from the recording disk through the head is more than a characteristic frequency of the chassis determined in accordance with a mass of the chassis and a spring constant of the elastic member and less than a characteristic frequency of the counter member determined in accordance with a mass of the counter member and the spring constant for the counter member.

3. A recording disk drive apparatus according to claim 1, wherein the counter member has at least two counter elastic elements discrete with respect to each other so that the spring constant for the counter member for supporting elastically the counter member with respect to the chassis body is formed by the at least two counter elastic elements.

4. A recording disk drive apparatus according to claim 1, wherein the counter member has a counter elastic element connected to the chassis body, and a length of the counter elastic element in a direction parallel to a thickness direction of the recording disk is elastically changeable to form at least partially the spring constant for the counter member.

5. A recording disk drive apparatus according to claim 1, wherein a characteristic frequency of the chassis determined in accordance with a mass of the chassis and a spring constant of the elastic member is less than a characteristic frequency of the counter member determined in accordance with a mass of the counter member and the spring constant for the counter member.

6. A recording disk drive apparatus according to claim 1, further comprising a screw pressing the spindle motor against the chassis body, wherein the counter member having a characteristic frequency determined in accordance with a mass of the counter member and the spring constant for the counter member which characteristic frequency is more than a rotational frequency of the spindle motor for rotationally driving the recording disk when the information is recorded into the recording disk and/or read from the recording disk through the head and a characteristic frequency of the chassis determined in accordance with a mass of the chassis and a spring constant of the elastic member extends at a radial outside of an imaginary circle having a radial center of a rotational axis of the spindle motor and passing the screw as seen in a thickness direction of the recording disk.

7. A recording disk drive apparatus according to claim 1, wherein the counter member has a characteristic frequency determined in accordance with a mass of the counter member and the spring constant for the counter member which characteristic frequency is more than a rotational frequency of the spindle motor for rotationally driving the recording disk when the information is recorded into the recording disk and/or read from the recording disk through the head and a characteristic frequency of the chassis determined in accordance with a mass of the chassis and a spring constant of the elastic member, and as seen in a thickness direction of the recording disk, a minimum distance between a rotational axis of the spindle motor and an outer peripheral edge of the counter member is smaller than a difference between the minimum distance and a maximum distance between the rotational axis of the spindle motor and the outer peripheral edge of the counter member.

8. A recording disk drive apparatus for recording an information into a recording disk and/or reading the information from the recording disk, comprising, a chassis including a chassis body, a spindle motor fixed to the chassis body to support and rotationally drive the recording disk, and a head supported on the chassis body to be movable on the chassis body in a radial direction of the recording disk so that the information is recorded into the recording disk and/or read from the recording disk through the head, a base member on which the chassis is supported, and an elastic member through which the chassis is supported on the base member so that a vibration transmitted from the chassis is absorbed at least partially by an elasticity of the elastic member, wherein the chassis further includes a counter member elastically supported on the chassis body to be movable with a spring constant with respect to the chassis body, wherein the apparatus further comprises a counter elastic element so that the spring constant is formed at least partially by the counter elastic element, wherein the counter elastic element include an elastomer adhering to the chassis body and the counter member, and as seen in a thickness direction of the recording disk, the counter elastic element protrudes outwardly from at least one of side edges of at least one of the counter member and the chassis body which side edges are opposed each other in a direction perpendicular to the thickness direction while the counter elastic element extends continuously between the side edges.

9. A recording disk drive apparatus according to claim 8, wherein the elastomer includes butyle rubber.

10. A recording disk drive apparatus for recording an information into a recording disk and/or reading the information from the recording disk, comprising, a chassis including a chassis body, a spindle motor fixed to the chassis body to support and rotationally drive the recording disk, and a head supported on the chassis body to be movable on the chassis body in a radial direction of the recording disk so that the information is recorded into the recording disk and/or read from the recording disk through the head, a base member on which the chassis is supported, and an elastic member through which the chassis is supported on the base member so that a vibration transmitted from the chassis is absorbed at least partially by an elasticity of the elastic member, wherein the chassis further includes a counter member elastically supported on the chassis body to be movable with a spring constant with respect to the chassis body, wherein the apparatus further comprises a counter elastic element so that the spring constant is formed at least partially by the counter elastic element, wherein the counter elastic element includes an elastomer adhering to the chassis body and the counter member, as seen in a direction perpendicular to a thickness direction of the recording disk, the counter elastic element protrudes outwardly from at least one of surfaces of at least one of the counter member and the chassis body which surfaces are opposed each other in the thickness direction while the counter elastic element extends continuously between the surfaces, and as seen in the thickness direction of the recording disk, the counter elastic element and the counter member overlap each other at least partially while the counter elastic element protrudes outwardly from at least one of side edges of at least one of the counter member and the chassis body which side edges are opposed each other in a direction perpendicular to the thickness direction and the counter elastic element extends continuously between the side edges.

11. A recording disk drive apparatus for recording an information into a recording disk and/or reading the information from the recording disk, comprising,
   a chassis including a chassis body, a spindle motor fixed to the chassis body to support and rotationally drive the recording disk, and a head supported on the chassis body to be movable on the chassis body in a radial direction of the recording disk so that the information is recorded into the recording disk and/or read from the recording disk through the head,
   a base member on which the chassis is supported, and
   an elastic member through which the chassis is supported on the base member so that a vibration transmitted from the chassis is absorbed at least partially by an elasticity of the elastic member,
   wherein the chassis further includes a counter member elastically supported on the chassis body to be movable with a spring constant with respect to the chassis body, and
   the apparatus further comprises a flexible electrically connecting wire being connected to the counter member and deformable in accordance with a movement of the counter member so that at least one of an electric energy for driving the spindle motor, an electric control signal for controlling the spindle motor, an electric energy for driving the head, an information electric signal transmitted between the head and the recording disk and an electric control signal for controlling the head is capable of being transmitted through the counter member and the flexible electrically connecting wire when the counter member vibrates.

* * * * *

UNITED STATES PATENT AND TRADEMARK OFFICE
CERTIFICATE OF CORRECTION

PATENT NO. : 7,380,253 B2 Page 1 of 1
APPLICATION NO. : 11/044702
DATED : May 27, 2008
INVENTOR(S) : Yamauchi et al.

It is certified that error appears in the above-identified patent and that said Letters Patent is hereby corrected as shown below:

Title Page, Item (73) should read:

-- (73) Assignees:   Hitachi, Ltd., Tokyo (JP)
                     Hitachi-LG Data Storage, Inc., Tokyo (JP) --

Signed and Sealed this

Sixteenth Day of December, 2008

JON W. DUDAS
*Director of the United States Patent and Trademark Office*